Sept. 11, 1923.
W. P. SCHUCK
APPARATUS FOR MAKING METAL CATALYSTS
Original Filed Dec. 29, 1919
1,467,397
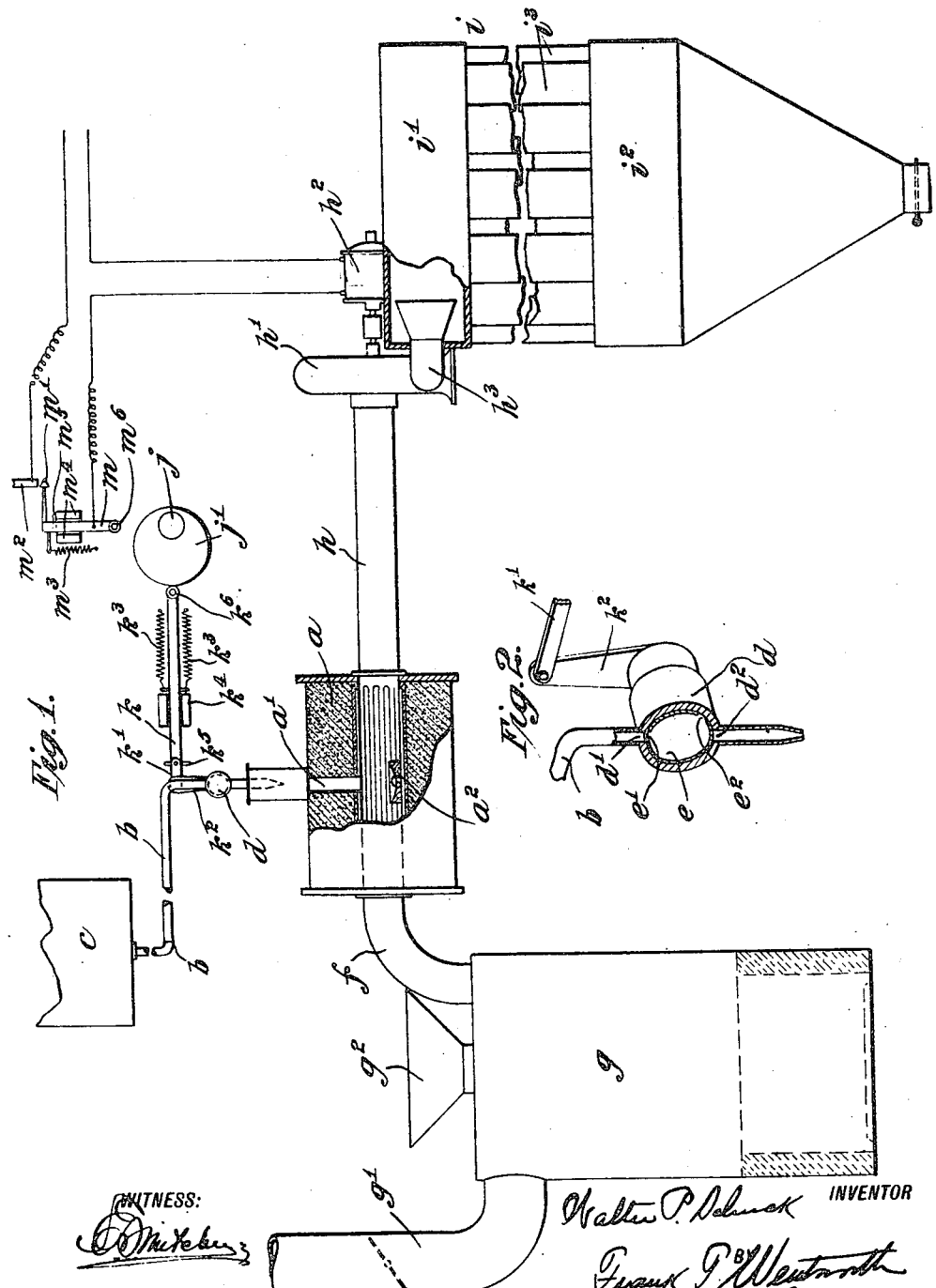

Patented Sept. 11, 1923.

1,467,397

UNITED STATES PATENT OFFICE.

WALTER P. SCHUCK, OF PORTLAND, OREGON, ASSIGNOR, BY MESNE ASSIGNMENTS, TO VEGETABLE OIL SECURITIES COMPANY, OF PITTSBURGH, PENNSYLVANIA, A CORPORATION OF PENNSYLVANIA.

APPARATUS FOR MAKING METAL CATALYSTS.

Application filed December 29, 1919, Serial No. 347,983. Renewed November 23, 1922.

*To all whom it may concern:*

Be it known that I, WALTER P. SCHUCK, a citizen of the United States, residing at Portland, in the county of Multnomah and State of Oregon, have invented certain new and useful Improvements in Apparatus for Making Metal Catalysts, of which the following is a specification, reference being had therein to the accompanying drawing, which forms a part thereof.

My invention relates to apparatus for making metal catalysts, and more particularly to an apparatus of this character which will so function as to produce succeeding small quantities of catalyst with sufficient rapidity to permit the economical production thereof for industrial purposes.

In the production of a non-oxidizing catalyst heretofore invented by me, I have found it necessary, in order to secure the desired reaction, to make only a small quantity of catalysts at a time. Such a catalyst is made in an electric muffle furnace, and in addition to exactitude in the proportions of the ingredients entering into the solution from which the catalyst is produced, the element of elapsed time during the treatment is fairly exact, and it is necessary to maintain certain working conditions within the muffle.

An apparatus made in accordance with my invention is so constructed and arranged that substantial exactitude in the quantity of solution delivered to the furnace, the timing of the treatment and the withdrawal of the completed product, is secured, conditions within the muffle prior to, during, and subsequent to the treatment of each batch being identical with that of every other batch, so as to secure uniformity in the product, as well as the rapid production thereof.

This apparatus is so constructed that the solution of each charge will be delivered thereto without admitting air to within the muffle, thus causing the muffle to be filled with an inert or non-oxidizing atmosphere during the charging of the muffle. The construction is such that during the reactions resulting from the application of heat to this solution while in said atmosphere, the only disturbance within the muffle will be that resulting from the evolution of gases resulting from the chemical reactions occurring at this time, such gases alone or mingled with inert gases already in the muffle forming a protective zone about the point of reaction.

Substantially immediately upon the conclusion of the reactions, a current of non-oxidizing gas is passed through the muffle, removing therefrom all those gases present during the reactions, and the flaky product of the reactions in suspension therein, the stoppage of this current of gas resulting in the restoration of the conditions within the muffle at the beginning of each cycle of operations of the apparatus, after the completion of said cycle. In this manner a substantially uniform product in comparatively large volume may be produced by means of the apparatus, which is the ultimate object of the invention.

At the same time removal of the product will be under conditions which will permit a sufficient loss of heat in the flaky particles to prevent the deterioration of the catalyst upon contact with air.

The invention consists primarily in an apparatus for making metal catalysts consisting of a muffle furnace adapted to be maintained at the desired temperature to assist the reaction of a solution from which the catalyst is formed, means through which an inert, non-oxidizing gas may enter said furnace, a reservoir for a supply of said solution, means connecting said reservoir with said furnace including therein a measuring valve whereby, with each actuation thereof, a measured quantity of said solution will be delivered within said furnace, a container adapted to receive the catalytic metal, an exhauster communicating with said furnace, and with said container, and a timing device adapted to cause the sequential actuation of said measuring valve and said exhauster; and in such other novel features of construction and combination of parts as are hereinafter set forth and described, and more particularly pointed out in the claims hereto appended.

Referring to the drawings,

Fig. 1 is a view showing, more or less conventionally, an apparatus embodying my invention, and Fig. 2 is a detail view of the measuring valve.

Like letters refer to like parts in both of said views.

In the embodiment of the invention shown in the drawings, the muffle furnace $a$, which is preferably of the electrical resistance type, has an opening $a'$ through the top wall thereof through which the solution to be treated is delivered to said furnace. Below the opening $a'$ is an open top vessel or trough $a^2$.

Discharging into the furnace $a$ through the opening $a'$ is a pipe $b$ leading from a reservoir $c$ in which a considerable volume of the solution is stored.

Since in practice I have found that it is impossible to secure the desired product by a continuous gradual flow of the solution into the furnace $a$, I arrange in the length of the pipe $b$ a measuring valve comprising a casing $d$ having oppositely disposed ports $d'$ and $d^2$ therein. Mounted in said casing is a hollow valve plug $e$ having an inlet port $e'$ and an outlet port $e^2$ therein, said ports being so set that when the outlet port $e^2$ is in register with the port $d^2$, the plug $e$ will close the port $d'$, and when the port $e'$ is in register with the port $d'$, the port $d^2$ will be closed.

The capacity of the plug $e$ is merely sufficient to supply the maximum volume of the solution which, when subject to the temperature of the furnace $a$, will be capable of those reactions to produce an active catalyst, experience having demonstrated that if a too great volume be supplied, I secure only a reduction of the metallic salt contained in the solution yielding a substance which is in an inactive form.

Opening into the furnace $a$ at one end thereof is a pipe $f$ through which $CO_2$ or other inert gases may be delivered to said furnace. In the form of the invention shown, these gases are produced in a furnace $g$ having a flue $g'$ and a charging hopper $g^2$ at the top thereof. In the furnace $g$, I maintain a bed of incandescent charcoal deep enough to produce sufficiently pure $CO_2$ for the purpose of the production of the catalyst. If coke or coal be used in the furnace $g$, the $CO_2$ will contain sulphur fumes and other impurities which will prevent the production of an active catalyst. Of course the invention is in no wise limited to the method or the material used as a source of supply of this $CO_2$, the charcoal furnace being merely an efficient and economical means for producing such, having the advantage that the $CO_2$ will enter the muffle furnace at an elevated temperature.

Leading from the end of the furnace $a$ opposite the pipe $f$ is a pipe $h$ communicating with the intake of an exhaust fan $h'$, the rotor of which is driven by an electric motor $h^2$. The discharge of said exhauster communicates, through the pipe $h^3$, with a collector or container $i$ into which the completed product is delivered. Said container or collector comprises a top drum $i'$ into which the pipe $h$ discharges, and a bottom hopper $i^2$, said drum and said hopper being connected by a plurality of cloth tubes $i^3$, an arrangement which ensures the effective collection of the catalyst, and permits the escape of gases from the container without likelihood of such gases carrying any of the catalyst in suspension in the gases from the container.

In the operation of the apparatus it is essential that batches of the solution in substantially uniform volume be intermittently delivered within the furnace $a$, and that atmospheric air be excluded from said furnace at all times while the apparatus is in operation. It is also essential that during the reaction period the furnace be charged with inert gas having no motion beyond the disturbances resulting from the evolution of the gases going on within the furnace. Upon the completion of such reactions, it is essential to substantially instantly withdraw the completed catalyst from the furnace while in suspension in the gases therein, which step involves the withdrawal from the furnace with the catalyst of the $CO_2$ and other gases.

By reason of the above conditions, it is essential that a timing mechanism be employed, which will successively cause the actuation of the valve $e$ and of the exhauster $h$ to ensure delivery of a batch of solution to within said furnace and allow a sufficient interval to elapse for the completion of the reaction, before withdrawing the gases and the catalyst from the furnace.

The timing mechanism above referred to, in the form of the invention shown, comprises a shaft $j$ which, when the apparatus is in operation, is continuously rotated at low speed in any desired manner and from any desired source of power. This shaft has mounted thereon an eccentric $j'$, by means of which movement is imparted to the valve plug $e$ through the medium of a reciprocatory rod $k$ carrying a pitman $k'$ pivotally connected with the stem $k^2$ of said valve plug. Springs $k^3$ act upon said rod $k$ in a manner to restore said rod to its normal position with the valve plug $e$ so positioned as to cause the port $e'$ to register with the port $d'$, and cause the closure of the port $d^2$.

The rod $k$ is guided in its movement by suitable guide blocks $k^4$, said rod being provided with suitable stops $k^5$ to limit the action of the springs $k^3$ to that desired. I provide the opening of the rod $k$ with an anti-friction roller $k^6$ adapted to be engaged by the eccentric $j'$. The rod $k$ extends substantially radially of the shaft $j$.

Also extending substantially radially of said shaft $j$, at any desired number of degrees from the shaft $k$, is a reciprocatory actuating rod $m$ carrying an electrical contact $m'$ adapted to co-operate with a fixed electrical contact $m^2$, said contacts being arranged in the circuit to the motor $h^2$. The rod $m$ is acted upon by a spring $m^3$ normally thrusting it toward the shaft $j$, movement of said rod being guided and limited by guides $m^4$ and a stop pin $m^5$ carried by said rod. The said rod is also provided with an anti-friction roller $m^6$ adapted to be engaged by the eccentric $j'$.

The operation of the herein described apparatus is substantially as follows:—

In preparing for a run, the furnace $a$ is brought to the desired temperature, which varies from about 550° to 650° C., and a charcoal fire is started in the furnace $g$. When the conditions are right, the current to the motor $h^2$ is closed for a short interval, thus drawing $CO_2$ from the furnace $g$ and discharging it into the collector $i$. With the stoppage of the exhauster $h'$, however, there will be a volume of $CO_2$ within the furnace $a$. Power is then applied to the shaft $j$, and thereafter the apparatus will operate continuously, requiring no attention beyond the renewal of the fuel in the furnace $g$, and of the supply of solution in the reservoir $c$, with occasional inspection of the furnace $a$ to determine that the temperature conditions are proper.

Under the conditions above stated the hollow valve plug $e$ will fill with solution from the reservoir $c$, thus segregating a measured quantity of this solution.

With the rotation of the eccentric $j'$ a reciprocatory movement will be imparted to the rod $k$, thus turning the valve $e$ in a manner to close the port $d'$ and bring the port $e^2$ of said plug into register with the port $d^2$, so that the contents of said plug will be discharged through the pipe $d$ and the opening $a'$ into the vessel or trough $a^2$.

As soon as the solution is delivered to said vessel or trough, evaporation and decomposition of the solution under the heat maintained within the furnace, will occur, the reactions thus produced resulting in the phenomena of the formation of an incandescent ball, from the surface of which small light flaky particles will be discharged, these particles remaining more or less in suspension in the inert gas with which the furnace is filled. These particles with a proper solution and a proper temperature, and other conditions within the furnace, as described, consist of a sub-oxid of the metallic salt which is in the solution, which sub-oxid is catalytically active and non-oxidizing at normal temperature.

With a continued rotation of the eccentric $j'$ the contact surface thereof will permit the return of the rod $k$ to its normal position, thus imparting a return movement to the plug $e$ resulting in the closure of the port $d^2$ and the registering of the ports $e'$ and $d'$ so that the solution may again flow into the plug $e$.

Thereafter the eccentric $j'$ will engage the rod $m$ and close the contacts $m'$ and $m^2$, thus starting the exhauster $h'$ which will withdraw from the furnace $a$, the $CO_2$ introduced thereinto prior to the delivery of the solution, and the gases evolved and the catalytically active powder in suspension therein as a result of the evaporation and decomposition of the solution, delivering them to the drum $i'$, the gases escaping through the cloth tubes $i^3$, the powder being retained within said tubes or dropping to the bottom hopper $i^2$ of the collector $i$.

Since the minute particles of the catalyst readily give up their heat, they will be cooled sufficiently before delivery to the collector, to permit them, if necessary, to be exposed to air without impairing their efficiency as a catalyst. While being withdrawn from the furnace and delivered to the collector, these particles however, will be surrounded by gases from within the furnace, which will be delivered to the collector with the catalyst so that even after their delivery into said collector they will be in a non-oxidizing atmosphere. The tubes $i^3$ screen the gases discharged into the collector, and prevent the development of excess pressure therein. At the same time these tubes will prevent the escape of the small particles of catalyst with the gases passing therethrough.

As the eccentric $j'$ continues to rotate it will permit the separation of the contacts $m'$ and $m^2$, thus interrupting the circuit to the motor $h^2$ and checking the circulation or flow of the $CO_2$ within the furnace $a$ preparatory to the succeeding cycle of operation of the apparatus. Hence during the stages of the delivery of the measured quantity of solution, and during the reactions going on within the furnace, there will be no movement of the gases with which the furnace is charged, excepting those resulting from the evolution of gases during such reactions. This condition has been found necessary, since the presence of the evolved gases about the incandescent mass appears to contribute in some way toward the production of a catalytically active product.

By means of an apparatus like that herein described, I am enabled to produce a catalyst with a rapidity commensurate with the actual time required for the reactions, the operation being characterized by the intermittent delivery of a batch of the solution and withdrawal of the completed product, a continuous production of such catalysts having been found to be impossible.

The functioning of the apparatus, however, is entirely automatic, and by accuracy in the timing of the different steps in each cycle, the desired rapidity in the production of the catalyst is secured, as well as uniformity in all catalyst delivered to the collector.

When working conditions have once been properly established, the functioning of the apparatus will ensure substantially the same conditions as to the corresponding stage of each succeeding cycle.

The apparatus of this application is particularly adapted for use in producing a non-oxidizing catalyst in the form of a black, flaky powder derived from a solution of nitrate of nickel and sugar, although it is not my desire to limit the invention to use with this particular solution.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An apparatus for making metal catalysts consisting of a muffle furnace adapted to be maintained at the desired temperature to assist the reaction of a solution from which the catalyst is formed, means through which an inert, non-oxidizing gas may enter said furnace, a reservoir for a supply of said solution, means connecting said reservoir with said furnace including therein a measuring valve whereby, with each actuation thereof, a measured quantity of said solution will be delivered within said furnace, a container adapted to receive the catalytic metal, an exhauster communicating with said furnace and with said container, and a timing device adapted to cause the sequential actuation of said measuring valve and said exhauster.

2. An apparatus for making metal catalysts consisting of a muffle furnace adapted to be maintained at the desired temperature to assist the reaction of a solution from which the catalyst is formed, a reservoir for a supply of said solution, intermittently operative means whereby a measured quantity of said solution is delivered at predetermined intervals to said furnace, an intermittently operative exhauster adapted to withdraw the completed product from said furnace, a timing device whereby said intermittently operative means and said exhauster are actuated successively with an elapsed interval sufficient to permit the required reaction, and means whereby said furnace will be charged with an inert, non-oxidizing gas prior to the delivery of the solution thereto.

3. An apparatus for making metal catalysts consisting of a muffle furnace adapted to be maintained at the desired temperature to assist the reaction of a solution from which the catalyst is formed, a furnace adapted to produce $CO_2$, a pipe connecting said last named furnace with one end of said muffle furnace through which the $CO_2$ may enter said furnace, a reservoir for a supply of said solution, means connecting said reservoir with said muffle furnace including therein a measuring valve whereby, with each actuation thereof, a measured quantity of said solution will be delivered within said muffle furnace, a container adapted to receive the catalytic metal, an exhauster communicating with the other end of said muffle furnace and with said container, and a timing device adapted to cause the sequential actuation of said measuring valve and said exhauster.

4. An apparatus for making metal catalysts consisting of a muffle furnace adapted to be maintained at the desired temperature to assist the reaction of a solution from which the catalyst is formed, means through which an inert, non-oxidizing gas may enter said furnace, a reservoir for a supply of said solution, means connecting said reservoir with said furnace including therein a measuring valve whereby, with each actuation thereof, a measured quantity of said solution will be delivered within said furnace, a container adapted to receive the catalytic metal, comprising an upper drum, a bottom hopper, fabric tubes extending from said drum to said hopper, an exhauster communicating with said furnace and with the drum of said container, and a timing device adapted to cause the sequential actuation of said measuring valve and said exhauster.

5. An apparatus for making metal catalysts consisting of a muffle furnace adapted to be maintained at the desired temperature to assist the reaction of a solution from which the catalyst is formed, a furnace adapted to produce $CO_2$, a pipe connecting said last named furnace with one end of said muffle furnace through which the $CO_2$ may enter said furnace, a reservoir for a supply of said solution, means connecting said reservoir with said muffle furnace including therein a measuring valve whereby, with each actuation thereof, a measured quantity of said solution will be delivered within said muffle furnace, a container adapted to receive the catalytic metal, comprising an upper drum, a bottom hopper, fabric tubes extending from said drum to said hopper, an exhauster communicating with the other end of said muffle furnace and with the drum of said container, and a timing device adapted to cause the sequential actuation of said measuring valve and said exhauster.

6. An apparatus for making metal catalysts consisting of a muffle furnace adapted to be maintained at the desired temperature to assist the reaction of a solution from which the catalyst is formed, means through which an inert, non-oxidizing gas may enter said furnace, a reservoir for a supply of said solution, means connecting said reservoir with said furnace including therein a measuring valve whereby, with each actuation thereof, a measured quantity of said solution will be delivered within said furnace, a container adapted to receive the catalytic metal, an exhauster communicating with said furnace and with said container, a continuously rotating member, means arranged in the path of said member, and operatively connected with said measuring valve, whereby said valve will be opened under the control of said rotating member, means normally tending to close said valve, means controlling the application of power to said exhauster also arranged in the path of movement of said rotary member, whereby power will be applied to said exhauster through the engagement of said rotary member with said last named means, and means tending to normally prevent the application of power to said exhauster, said valve opening means and power control means being spaced apart sufficiently to afford an interval between the opening of said valve and the actuation of said exhauster, to permit the desired reactions within said furnace.

7. An apparatus for making metal catalysts consisting of a muffle furnace adapted to be maintained at the desired temperature to assist the reaction of a solution from which the catalyst is formed, a furnace adapted to produce $CO_2$, a pipe connecting said last named furnace with one end of said muffle furnace through which the $CO_2$ may enter said furnace, a reservoir for a supply of said solution, means connecting said reservoir with said muffle furnace including therein a measuring valve whereby, with each actuation thereof, a measured quantity of said solution will be delivered within said muffle furnace, a container adapted to receive the catalytic metal, comprising an upper drum, a bottom hopper, fabric tubes extending from said drum to said hopper, an exhauster communicating with the other end of said muffle furnace and with the drum of said container, a continuously rotating member, means arranged in the path of said member, and operatively connected with said measuring valve, whereby said valve will be opened under the control of said rotating member, means normally tending to close said valve, means controlling the application of power to said exhauster also arranged in the path of movement of said rotary member, whereby power will be applied to said exhauster through the engagement of said rotary member with said last named means, and means tending to normally prevent the application of power to said exhauster, said valve opening means and power control means being spaced apart sufficiently to afford an interval between the opening of said valve and the actuation of said exhauster, to permit the desired reactions within said furnace.

In witness whereof I have hereunto affixed my signature, in the presence of two subscribing witnesses, this 13th day of Dec., 1919.

WALTER P. SCHUCK.

Witnesses:
HEIDEL SCHUCK,
E. T. PLATT.